United States Patent
Yee et al.

(10) Patent No.: US 7,123,791 B2
(45) Date of Patent: Oct. 17, 2006

(54) OPTICAL FIBER COUPLING SYSTEM AND MANUFACTURING METHOD THEREOF

(75) Inventors: Young-Joo Yee, Gyeonggi-Do (KR); Hyouk Kwon, Seoul (KR); Chang-Hoon Oh, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/745,680

(22) Filed: Dec. 29, 2003

(65) Prior Publication Data
US 2004/0136651 A1 Jul. 15, 2004

(30) Foreign Application Priority Data
Dec. 31, 2002 (KR) ............... 10-2002-0088392
Jul. 15, 2003 (KR) ............... 10-2003-0048329

(51) Int. Cl.
*G02B 6/32* (2006.01)
(52) U.S. Cl. .................... 385/33; 385/14; 385/31
(58) Field of Classification Search ............ 385/31, 385/33, 34, 35, 39, 14, 15; 372/108, 109; 359/618, 619, 621–623, 628
See application file for complete search history.

(56) References Cited
U.S. PATENT DOCUMENTS 5,580,471 A   12/1996  Fukumoto et al. ..... 219/121.63
5,802,092 A   9/1998   Endriz ..................... 372/50
6,157,502 A * 12/2000  Kathman .................. 359/819
6,317,443 B1  11/2001  Craig et al. ............. 372/38.04
2003/0223685 A1* 12/2003 Hasegawa et al. ............ 385/31

FOREIGN PATENT DOCUMENTS

DE  19613755 A1  10/1997
GB  2220501 A    1/1990
JP  05-164947    6/1993

OTHER PUBLICATIONS

E. Gros et al. "Ferroelectric Liquid Crystal Optical Waveguide Switches Using the Double-Refraction Effect" IEEE Photonics Technology Letters, vol. 13, No. 2, Feb. 2001, pp. 115-117.

* cited by examiner

*Primary Examiner*—Frank G. Font
*Assistant Examiner*—James P. Hughes
(74) *Attorney, Agent, or Firm*—Fleshner & Kim, LLP

(57) ABSTRACT

An optical fiber coupling system is provided which minimizes beam loss. The system includes a substrate with a laser beam emitting unit attached at one end, a first fine lens which focuses or collimates a vertical beam emitted by the laser beam emitting unit, a set of second fine lenses which focus or collimate a horizontal beam emitted by the laser beam emitting unit, and a beam output unit which outputs the beam focused or collimated by the first and second fine lenses. This arrangement reduces an alignment error associated with this type of optical system and improves a degree of beam focus. Additionally, the optical fiber coupling system can be made compact and available for mass-production.

23 Claims, 5 Drawing Sheets

OPTICAL FIBER COUPLING SYSTEM AND MANUFACTURING METHOD THEREOF

BACKGROUND OF THE INVENTION

1. Field of the Invention

The present invention relates to an optical fiber coupling system and, more particularly, to an optical fiber coupling system with a compact size capable of minimizing a beam loss and suitable for a mass production, and its manufacturing method.

2. Description of the Background Art

Recently, as demands on a high output laser light are increasing and a new application field is extended, researches on a high output semiconductor laser are actively ongoing.

The application field is extended to a display using laser such as a CD-RW or a DVD-RAM, optical recording medium, or a large-screen projector, a laser wireless communication, a material processing using laser (welding, cutting and fine processing related to a semiconductor, or the like), an optical amplifier and a pumping light source used for a medical use or a military use.

In the case of the pumping light source of a solid state laser, the material processing and the medical laser, a high laser output more than a few Watt level is required. Especially, the pumping of the solid state laser is a critical and big application field for a high output diode laser.

One method for obtaining such a high laser output is that a high output laser diode is formed in an array type for use. In this method, in order to heighten an efficiency of the laser diode array, several laser beams radiated from the laser diode array are coupled to each optical fiber corresponding to each laser diode, and the optical fiber array is bundled to be used as a light source for pumping, whereby a high laser output can be obtained with the beam emitted from the laser diode array.

The high output semiconductor laser is used as an optical fiber coupling system according to applications, and the optical fiber coupling system includes an optical fiber array having a suitable numerical aperture (NA) and a core diameter, and a refractive optical lens serving to collimate the diode array beam.

The existing optical fiber coupling system including the refractive optical lens is a device designed for a beam form of a multi-mode high output diode laser. In order to reduce radiation of the laser optical source and couple the optical fiber, the existing optical fiber coupling system requires a complicate three-dimensional shaped lens structure and an optical system with a high performance.

A spread angle of light radiated from the laser diode is determined depending on a structure of the laser diode. In case of the high output laser diode, generally, an light-spread angle is in the range of about 32~44 in a vertical direction, and about 8~12 in the horizontal direction. This is because the size of a transversal section of a semiconductor laser oscillation region is a few micrometer ($\mu m$), that is, so small that the output light is radiated at a wide angle owing to a diffraction effect.

At this time, having different horizontal and vertical angles, an overall distribution of the horizontal mode of the output light is oval.

In order to reduce the loss of the laser beam made incident on the optical fiber of the output terminal due to such unbalance of the light spread angle, preferably, a laser beam spread angle is to be reduced. In this case, by coupling the optical system utilizing predetermined lenses providing a focusing performance corresponding to each spread direction, the light spread angle can be reduced to obtain a high efficiency for the output terminal optical fiber.

As to the optical connection between the laser diode and the optical fiber of the output terminal, the light spread angles are different at the horizontal and vertical directions, so two lens surfaces are required.

FIGS. 1 and 2 show beam paths from a lens to an optical fiber of the output terminal according to a difference in the light spread angle in the horizontal and vertical directions of the general laser diode in a coupling optical system using a three-dimensional shaped lens in accordance with a conventional art.

With reference to FIG. 1, a lens R1 serves to collimate the laser beam with a wide light-spread angle radiated from the laser diode in a horizontal direction, and with reference to FIG. 2, a lens R2 focuses laser beam radiated from the laser diode 10 in a side direction and makes it incident on a core, or a waveguide, of the optical fiber 20 of the output terminal.

By using the three-dimensional lens, the optical fiber coupling system converts the form of beam radiated from the laser diode. Consequently, the lens R1 having a high numerical aperture collimates from an axis with a wide light-spread angle while the second-dimensional lens R2 projects an expanded light source to an axis with a smaller light-spread angle of the laser diode.

A beam forming function of the optical fiber forms an almost circular spot at an inlet part of the optical fiber of the output terminal and can be used to pump laser mode. An efficiency of the structure is dependent upon the diode laser and the optical fiber as well as the optical system.

In order for the optical fiber coupling system to have a maximum performance, the laser spread angle needs to be small as possible while the aperture of the optical fiber needs to be large, and the lenses of the optical system should be accurately aligned according to size. Light coming into the optical fiber with a small angle is totally, internally reflected from a core-cladding interface, and at this time, a portion of the totally-reflected light is absorbed, causing an output reduction.

Thus, the optical fiber coupling optical system needs to be designed to accomplish a maximum coupling efficiency, and a light source including the optical fiber needs to be optimized. Lenses serving for collimation reduce a spread angle of laser beam radiated from the laser diode, and the smaller the diameter of the collimated beam is, the easier a laser pumping is at a solid state laser medium, which makes the number of the optical devices reduce and the energy density for pumping increase.

In case of the optical fiber used by being optically connected to the high output laser diode array, its numerical aperture is 0.16~0.39, and its core size is 100~600 um. Especially, the laser diode emitting light with the optical fiber having a small numerical aperture is significantly used for a medical, solid state laser pumping. A coupling optics used for such usage is fabricated as a product by molding a lens made of glass and replicating it.

In these methods, a high-priced lens is aligned with and attached to the laser diode, the collimated beam coming out through the lens is focused to the optical fiber after passing through several lenses or respectively focused to the optical fiber array positioned at regular intervals, to obtain a high output beam.

However, the two methods are to use a high-priced lens having a complicate three-dimensional shape or a series of lens array, and in this respect, the three-dimensional lens are can be favored for a mass-production because it is fabricated in an injection form using a precisely-processed high-priced metal mold. But fabrication of the metal mold is difficult and costly, and in addition, since the minimum size of the lens is limited to the minimum size of a tool for processing a curved surface of the lens of the metal mold, it is very difficult to make the coupling optical system very small (slim).

SUMMARY OF THE INVENTION

Therefore, an object of the present invention is to provide an optical fiber coupling system which is able to minimize beam loss, compact and suitable for a mass-production, and its manufacturing method.

To achieve these and other advantages and in accordance with the purpose of the present invention, as embodied and broadly described herein, there is provided an optical fiber coupling system including: a substrate 110 having a predetermined area; a laser beam emitting unit 120 attached at one side of the substrate 110 and emitting beam; a first fine lens 130 insertedly fixed at a first mounting groove 111 formed on the substrate 110 and focusing or collimating vertical beam emitted from the light radiating unit 120; second fine lenses 140 protrusively formed on the substrate 110 and focusing or collimating horizontal beam emitted from the light radiating unit 120; and a beam output unit 150 insertedly fixed to a second mounting groove 112 formed on the substrate 110 and outputting beam focused or collimated by the first and second fine lenses.

To achieve the above objects, there is also provided a method for manufacturing an optical fiber coupling system including: forming mounting grooves with a predetermined shape on a substrate 110 having a predetermined area; coating a thick film photosensitizer with a predetermined thickness on the substrate 110 and forming second fine lenses for focusing or collimating horizontal beam by photolithography; bonding a first fine lens for focusing or collimating vertical beam and an output terminal optical fiber for pumping beam into the mounting grooves of the substrate 110; and aligning and bonding laser diodes on the substrate 110.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
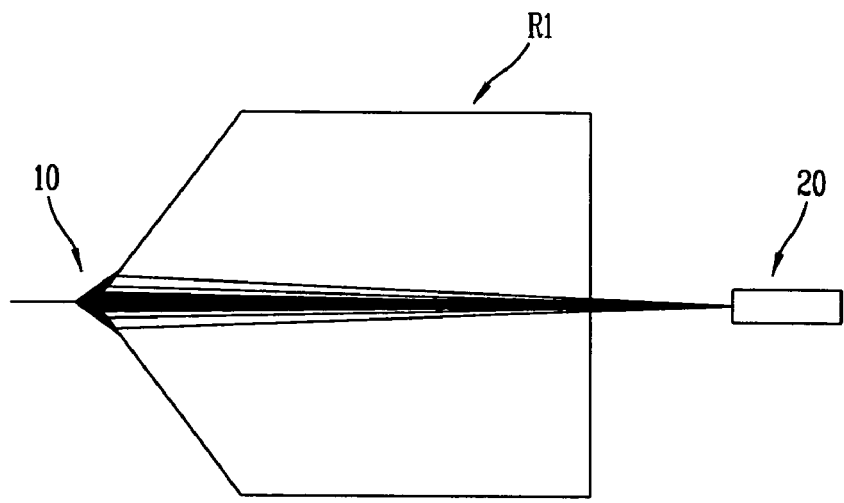
FIGS. 1 and 2 are plane views showing coupling optical system using three-dimensional shaped lens in accordance with a conventional art.
Figure 2:
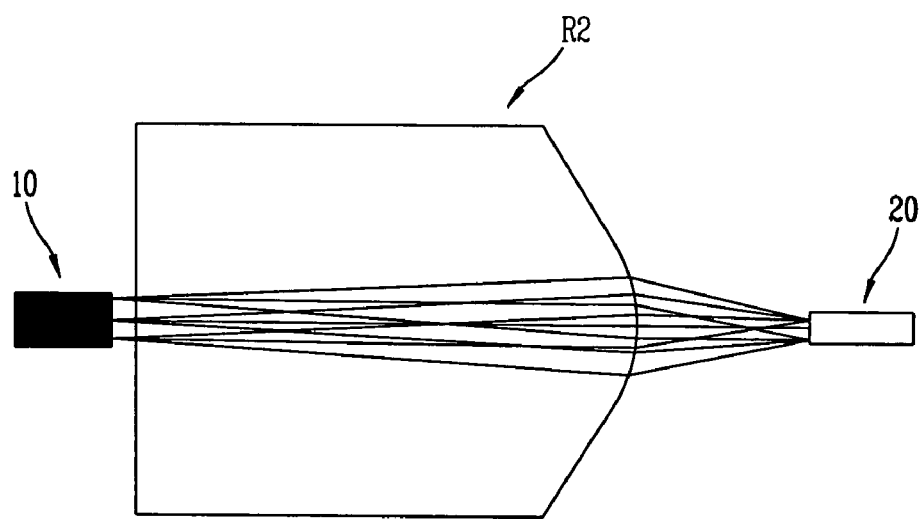
Figure 3:
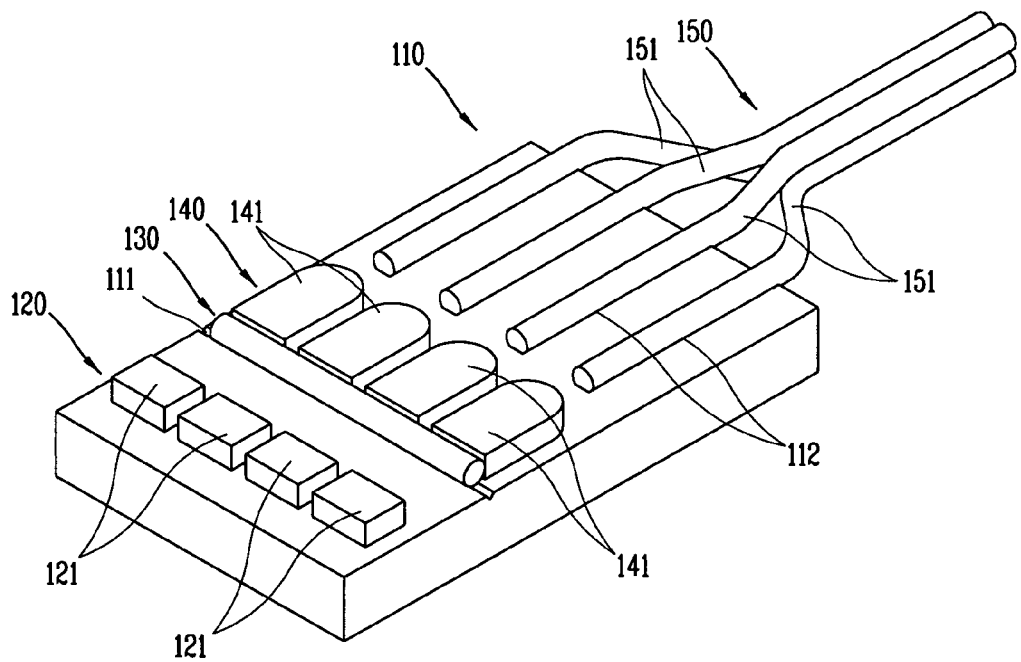
FIG. 3 is a perspective view showing an optical fiber coupling system in accordance with one embodiment of the present invention.
Figure 4:
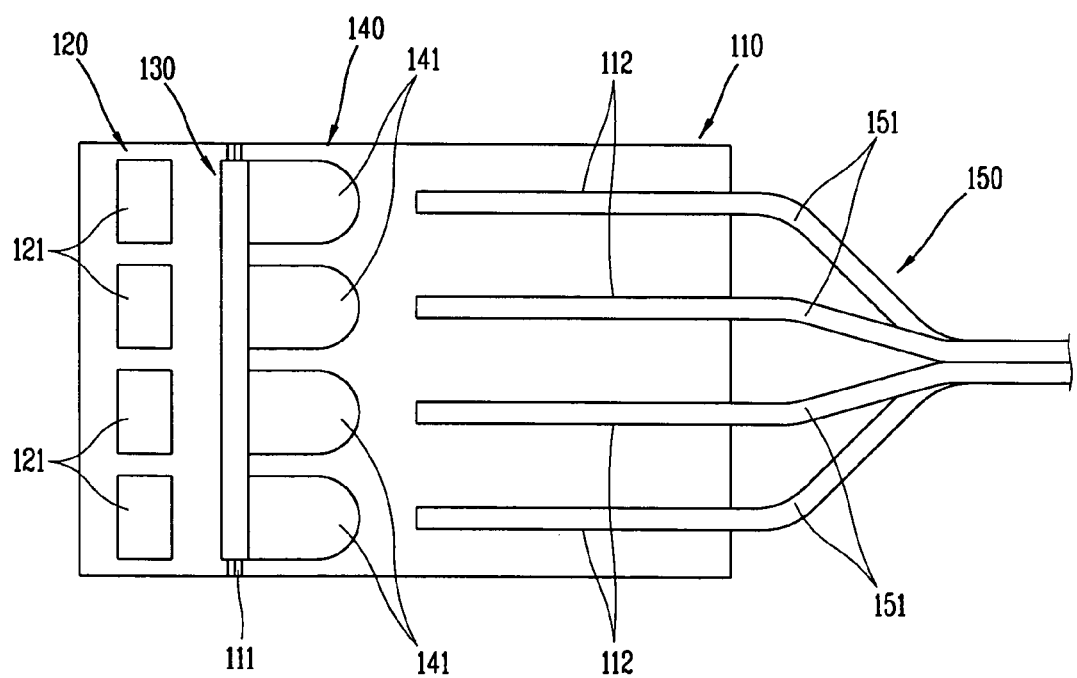
FIGS. 4 and 5 are plane view and front view showing the optical fiber coupling system.
Figure 5:
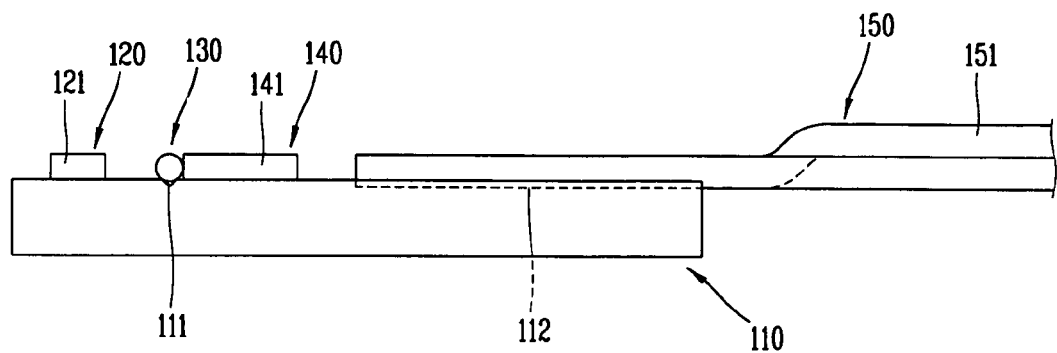

FIG. 3 is a perspective view showing an optical fiber coupling system in accordance with one embodiment of the present invention the present invention, and FIGS. 4 and 5 are plane view and front view showing the optical fiber coupling system.

As illustrated, the optical fiber coupling system in accordance with one embodiment of the present invention includes: a substrate 110 having a predetermined area; a laser beam emitting unit 120 attached at one side of the substrate 110 and emitting beam; a first fine lens 130 insertedly fixed at a first mounting groove 111 formed on the substrate 110 and focusing or collimating vertical beam emitted from the light radiating unit 120; second fine lenses 140 protrusively formed on the substrate 110 and focusing or collimating horizontal beam emitted from the light radiating unit 120; and a beam output unit 150 insertedly fixed to a second mounting groove 112 formed on the substrate 110 and outputting beam focused or collimated by the first and second fine lenses.

The first fine lens 130 and the second fine lenses 140 are positioned between the light radiation unit 120 and the beam output unit 150, and the first fine lens 130 is positioned at the side of the light radiating unit 120 while the second fine lenses 140 are positioned at the side of the beam output unit 150.

The substrate 110 is formed with a predetermined thickness and an area with a square form. The substrate 110 is a silicon substrate 110. A first mounting groove 111 is formed at one side of the substrate 110, and a second mounting groove 112 is formed at the other side of the substrate 110. The first and second mounting grooves 111 and 112 have a predetermined length and an inverse triangular form in its section.

The first mounting groove 111 is formed vertical to a longitudinal direction of the substrate 110 and the second mounting groove 112 is formed in a vertical direction of the first mounting groove 111, that is, in a longitudinal direction of the substrate 110. A plurality of second mounting grooves 112 are formed at regular intervals.

The second fine lenses 140 are second-dimensional disk-type lenses 141 with predetermined thickness and shape. That is, the disk-type lens 141 has a rectangular shape with a predetermined thickness and one side there is formed in a semicircular shape. The semicircular side is positioned in a longitudinal direction of the substrate 110.

The second fine lenses 140 are arranged at predetermined intervals at an upper surface of the substrate 110, protrusively formed at the upper surface of the substrate 110, and positioned in parallel next to the first mounting groove 111.

The beam output unit 150 includes a plurality of output terminal optical fibers 151 positioned at the same line as the disk-type lenses 141. The second mounting grooves 112 are formed as many as the number of output terminal optical fibers 151 which are as many as the number of the second fine lenses 140.

The plurality of output terminal optical fibers 151 are can be aligned to be bound to two or more-fold.

The first fine lens 130 has a cylindrical form with a predetermined length and diameter, and is inserted into the first mounting groove 111 of the substrate 110 and fixed by an adhesive.

The laser beam emitting unit 120 includes a plurality of laser diodes 121. The laser diodes 121 are arranged in a row parallel to the first fine lens 130, and attached to be fixed by an adhesive.

The operation of the optical fiber coupling system will now be described.

First, the laser diode array 121, laser beam emitting unit, emits laser beam. The beam is an ovally emitted beam with different horizontal and vertical spread angles, which passes through the cylindrical lens, the first fine lens 130. The first fine lens 130 focuses the vertical beam with a wide spread angle in a spot form. The focused beam passes through the second fine lenses 140, that is, the second-dimensional lenses, and is respectively focused to the output terminal optical fibers 151. The second fine lenses 140 serve to collimate the horizontal beam and the collimated beam is focused to the output terminal optical fiber 151. The angle of the laser beam focused to the output terminal optical fiber 151 is controlled by adjusting a lens curvature of the second fine lens 140.

Passing through the output terminal optical fibers 151, the laser beam is collected to be used as a high output pumping source of solid state laser.

The optical fiber coupling system as described above has such a structure that is able to heighten a focusing degree of laser beam as well as minimize an alignment error of an overall optical system.

In addition, the substrate 110 and the second fine lenses 140 of the optical fiber coupling system can be manufactured by a MEMS (Micro Electro Mechanical System) technology which applies a lithographic technology and a micromachining technology. Accordingly, the optical fiber coupling system can be compact and can be fabricated by a mass-production structurally.

Figure 6:
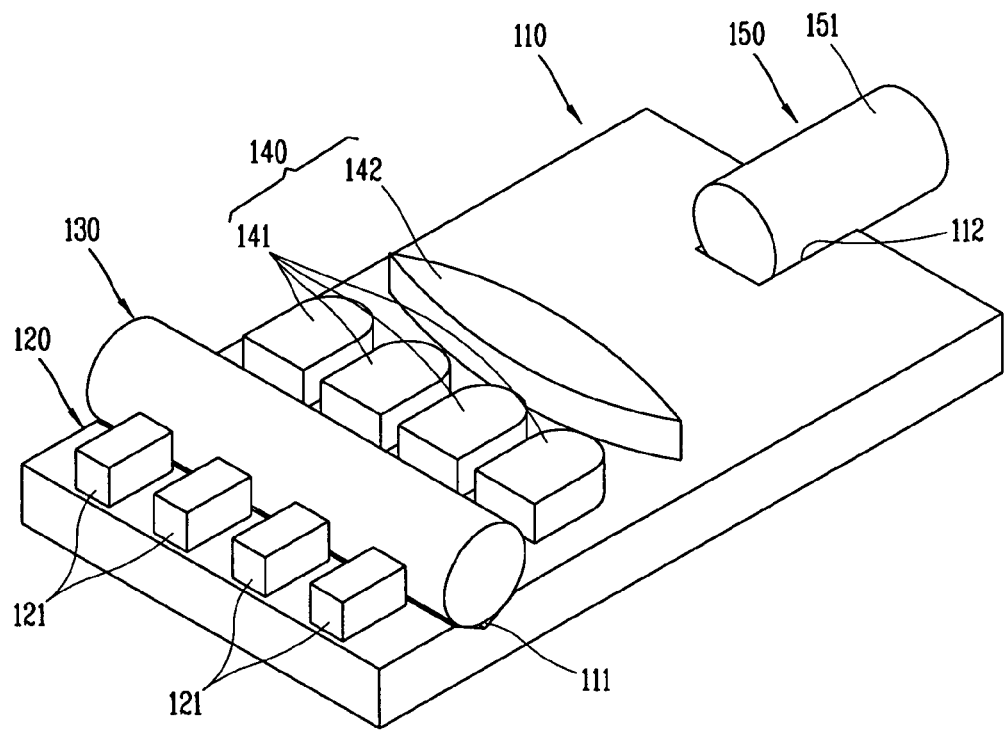
FIG. 6 is a perspective view showing an optical fiber coupling system in accordance with another embodiment of the present invention.
Figure 7:
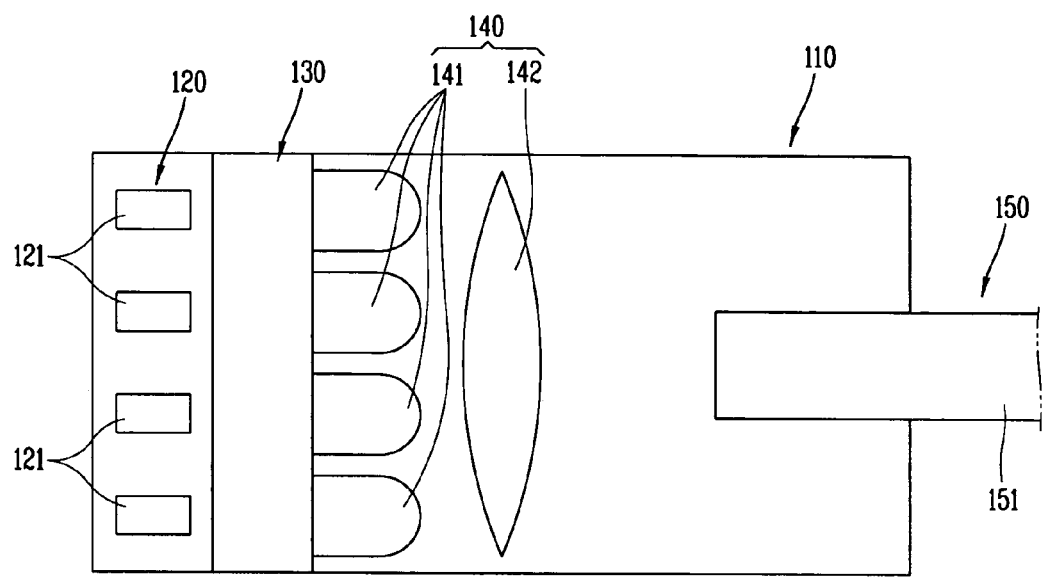
FIGS. 7 and 8 are plane view and front view showing the optical fiber coupling system.
Figure 8:
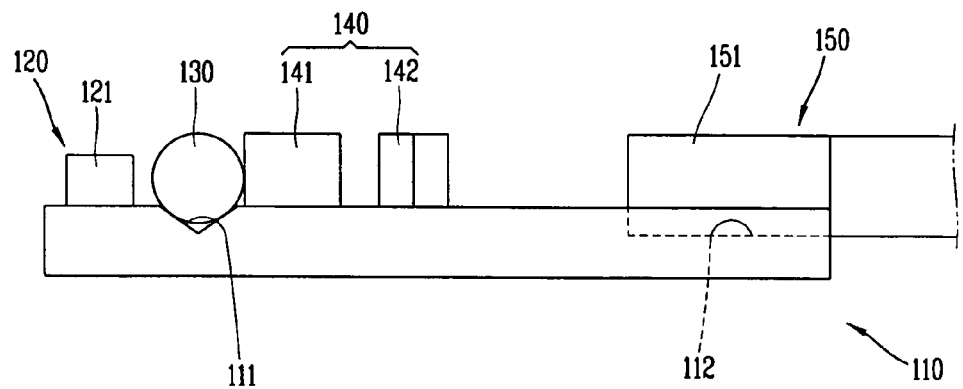

FIG. 6 is a perspective view showing an optical fiber coupling system in accordance with another embodiment of the present invention, and FIGS. 7 and 8 are plane view and front view showing the optical fiber coupling system.

The same reference numerals are given to the same elements as in the optical fiber coupling system of the former embodiment.

As illustrated, the optical fiber coupling system in accordance with another embodiment of the present invention includes: a substrate 110 having a predetermined area; a laser beam emitting unit 120 attached at one side of the substrate 110 and emitting beam; a first fine lens 130 insertedly fixed at a first mounting groove 111 formed on the substrate 110 and focusing or collimating vertical beam oscillated from the light radiating unit 120; second fine lenses 140 protrusively formed on the substrate 110 and focusing or collimating horizontal beam oscillated from the light radiating unit 120; and a beam output unit 150 insertedly fixed to a second mounting groove 112 formed on the substrate 110 and outputting beam focused or collimated by the first and second fine lenses.

The laser beam emitting unit 120 and the first fine lens 130 fixed to the first mounting groove 111 of the substrate 110 have the same construction as those of the optical fiber coupling system of the former embodiment of the present invention.

The second fine lenses 140 includes a second-dimensional disk-type lenses 141 having predetermined thickness and shape and a focusing lens 142 having predetermined thickness and oval shape.

The second-dimensional disk-type lens 141 has a rectangular shape with a predetermined thickness and a semicircular shape in its side, and the semicircular side is positioned in a longitudinal direction of the substrate 110.

The disk-type lenses 141 are arranged at predetermined intervals at an upper surface of the substrate 110, protrusively formed at the upper surface of the substrate 110, and positioned in parallel next to the first mounting groove 111.

The focusing lens 142 is formed with two circular curved faces with a predetermined curvature, and the length of the circular curved face corresponds to the overall length of the disk-type lenses 141. The focusing lens 142 is positioned adjacent in parallel to the arrangement of the disk-type lenses 141, and extendedly protruded on the substrate 110.

The beam output unit 150 is one output terminal optical fiber 151 positioned at a predetermined distance from the focusing lens 142. The output terminal optical fiber 151 is fixedly coupled to the second mounting groove 112 by an adhesive.

The second mounting groove 112 in which the output terminal optical fiber 151 is mounted has a predetermined length and an inverse-triangular form in its section. The second mounting groove 112 is formed in a longitudinal direction of the substrate 110 and positioned at a central line of the focusing lens 142.

The operation of the optical fiber coupling system constructed as described above will now be explained.

First, the laser diode array 121, that is, the laser diode emitting unit 120, emits laser beam. The beam is an ovally emitted beam with different horizontal and vertical spread angles, which passes through the cylindrical lens, the first fine lens 130. The first fine lens 130 focuses the vertical beam with a wide spread angle in a spot form. The focused beam passes through the second fine lenses 140, that is, the disk-type lenses 141, and the focusing lens 142, and is respectively focused to the output terminal optical fibers 151.

The disk-type lenses 141 serve to collimate the horizontal beam and the beams collimated respectively from the disk-type lenses 141 is focused as one beam to the output terminal optical fiber 151. The angle of the laser beam focused to the output terminal optical fiber 151 is controlled by adjusting a lens curvature of the second fine lens 142.

The optical fiber coupling system as described above has such a structure that is able to heighten a focusing degree of laser beam as well as minimize an alignment error of an overall optical system.

In addition, the substrate 110, the disk-type lenses 141, that is, the second fine lenses 140, and the focusing lens 142 constituting the optical fiber coupling system can be manufactured by a MEMS technology which applies a lithographic technology and a micromachining technology. Accordingly, the optical fiber coupling system can be compact and can be fabricated by a mass-production structurally.

FIGS. 9A to 9D are front views sequentially showing a method for manufacturing the optical fiber coupling system.

As illustrated, a method for manufacturing an optical fiber coupling system includes: forming mounting grooves 111 and 112 with a predetermined shape on a substrate 110 having a predetermined thickness and area; coating a thick film photosensitizer with a predetermined thickness on the substrate 110 and forming second fine lenses 140 for focusing or collimating horizontal beam by photolithography;

bonding a first fine lens for focusing or collimating vertical beam and an output terminal optical fiber 151 for pumping beam into the mounting grooves 111 and 112 of the substrate 110; and aligning and bonding laser diodes 121 on the substrate 110.

Figure 9A:
FIGS. 9A to 9D are front views sequentially showing a method for manufacturing the optical fiber coupling system.

As shown in FIG. 9A, the substrate 110 is formed such that a silicon wafer having a crystal orientation is subjected to a cleaning process and then an etch mask for the mounting grooves is patterned through photolithography.

The mounting grooves are respectively formed in a trench form. The mounting groove is formed in a trench by anisotropic wet etching with a chemical etching solution such as KOH, and subsequently, fine-processed by using a dry etching method such as a silicon deep reactive ion etching (RIE).

The depth of the mounting grooves 111 and 112 is determined depending on an outer diameter and length of the lenses mounted therein and an outer diameter of the output terminal optical fiber 151.

The second fine lenses 140 are fabricated such that a thick film photosensitizer such as SU-8 or the like is coated with a predetermined thickness on the silicon substrate 110 and a photolithography process is performed thereon.

Figure 9B:
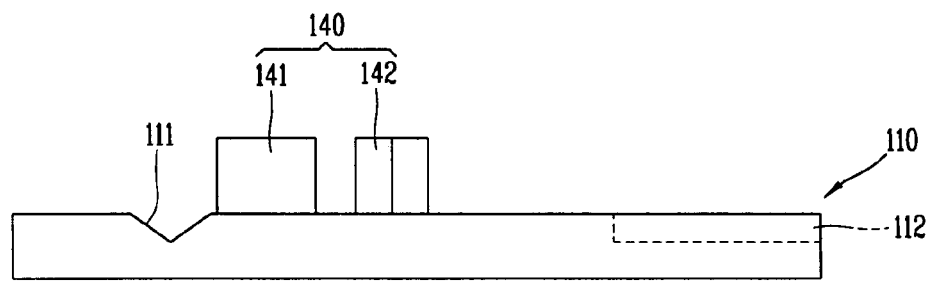

As shown in FIG. 9B, the second fine lenses 140 includes a disk-type lens 141 having a predetermined height and formed with three plane faces and one curved face at its sections, and one focusing lens 142 having a predetermined height and an oval form. The disk-type lenses 142 and the focusing lens 142 are second-dimensional lenses with the same height and are adjacently positioned. The disk-type lenses 141 are formed in a row.

In a different embodiment, the second fine lenses 140 may consist of the disk-type lenses 141 having a predetermined height and formed with three plane faces and one curved face at its sections, The disk-type lenses 141 are two-dimensional lenses with the same height and are arranged in a row.

The second fine lenses 140 can be constructed in various forms.

The second fine lenses 140 are fabricated by one time photolithography, and alignment of lenses are automatically made by the photolithography process.

Figure 9C:
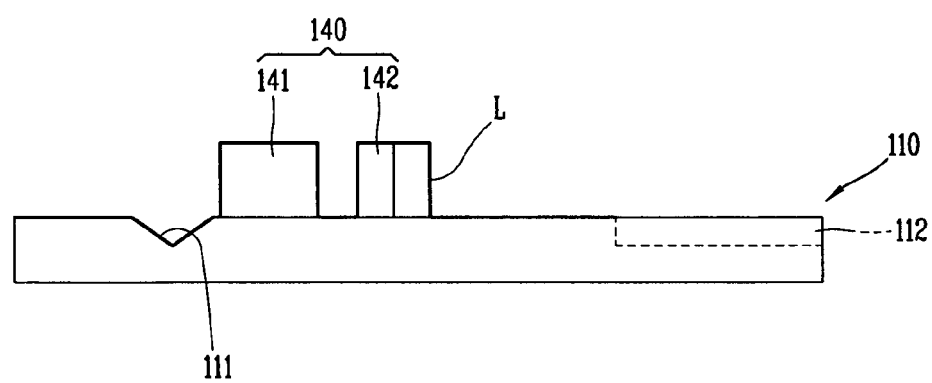

After forming the second fine lenses 140, as shown in FIG. 9C, an anti-reflection coating layer (L) is formed on the second fine lenses 140. The anti-reflection coating layer (L) is formed entirely by a thin film deposition method such as a sputtering process or an evaporation process.

Figure 9D:
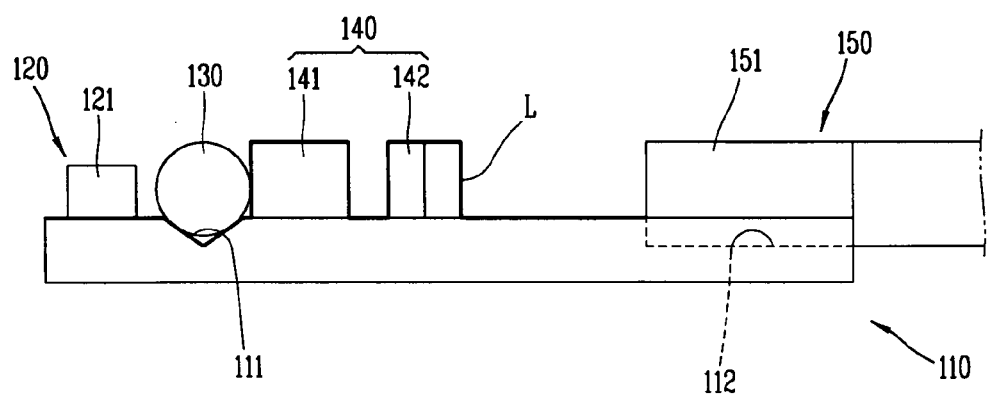

And then, as shown in FIG. 9D, the first fine lens 130 and the optical fiber 151 are positioned in the mounting grooves 111 and 112, respectively, and aligned and bonded by using a ultraviolet hardening resin adhesive or a thermosetting adhesive. The first fine lens 130 is a cylindrical lens having a predetermined length and outer diameter. The first fine lenses 130 and the output terminal optical fibers 151 are respectively positioned in the mounting grooves by a pick-and-place method.

The laser diodes 121 are aligned and bonded to the silicon substrate 110 by using a silicon bulk micromachining process and a solder bonding technique. In this case, additionally, an intermediate layer made of Cu or the like having a high thermal conductivity can be inserted to a portion of the substrate 110 where the laser diodes 121 are mounted, in order to quickly release heat generated from the laser diode 121 in operation.

In the method for manufacturing the optical fiber coupling system, the coupling optics focusing beams coming out of the laser diode array to one output terminal optical fiber 151 is integrated by using the lithography technology and the micromachining technology, so that an alignment error of the optical system can be reduced and beam focusing degree can be heightened. In addition, the optical fiber coupling system can be made compact, the number of assembly processes can be reduced, and a mass-production can be made.

As so far described above, the optical fiber coupling system and its manufacturing method of the present invention have the following advantages.

That is, because the alignment error of the optical system is reduced and the beam focusing degree is heightened, beam loss can be reduced and an efficiency of the output terminal optical fiber 151 can be improved.

In addition, because the number of assembly processes is reduced and the mass-production is available with a high uniformity, a manufacture cost can be considerably reduced.

Moreover, because the optical fiber coupling system is made slim, its application coverage can be extended.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical fiber coupling system, comprising:
    a substrate having a first mounting groove and at least one second mounting groove formed in an upper surface thereof;
    a laser beam emitting unit positioned at a first end of the substrate and configured to emit a beam;
    a first fine lens positioned in the first mounting groove and configured to focus or collimate a vertical axis of the beam emitted by the laser beam emitting unit;
    a plurality of second fine lenses formed integral to the upper surface of the substrate such that a portion of the first fine lens contacts an adjacent portion of each of the second fine lenses, wherein the plurality of second fine lenses are configured to focus or collimate a horizontal axis of the beam emitted by the laser beam emitting unit; and
    a beam output unit positioned in the at least one second mounting groove and configured to output the beam focused or collimated by the first and second fine lenses.

2. The system of claim 1, wherein the first fine lens and the plurality of second fine lenses are positioned between the laser beam emitting unit and the beam output unit.

3. The system of claim 1, wherein the substrate comprises a silicon substrate.

4. The system of claim 1, wherein the first mounting groove has a predetermined length and forms an inverse-triangular groove in the substrate.

5. The system of claim 1, wherein the first fine lens has a substantially cylindrical form with a predetermined length and a predetermined outer diameter.

6. The system of claim 1, wherein the laser beam emitting unit comprises a plurality of laser diodes arranged in a row.

7. The system of claim 1, wherein the plurality of second fine lenses are each two-dimensional disk-type lenses with a predetermined thickness and a predetermined shape, and wherein the beam output unit includes a plurality of output terminal optical fibers positioned corresponding to the plurality of second fine lenses.

8. The system of claim 7, wherein each of the disk-type lenses includes a face portion oriented in a beam-proceeding direction and a semicircular face portion oriented opposite the planar face portion.

9. The system of claim 7, wherein the at least one second mounting groove comprises a plurality of mounting grooves, and wherein each of the plurality of output terminal optical fibers are positioned in a corresponding second mounting groove, each of the plurality of second mounting grooves having a predetermined length and each forming an inverse-triangular groove in the substrate.

10. The system of claim 7, wherein the plurality of output terminal optical fibers are aligned so as to be bound to two-fold.

11. The system of claim 7, wherein the plurality of output terminal optical fibers are aligned so as to be bound to more than two-fold.

12. The system of claim 1, wherein the plurality of second fine lenses includes a plurality of two-dimensional disk-type lenses having a predetermined thickness and a predetermined shape, and one focusing lens having a predetermined thickness and a substantially oval shape, and wherein the beam output unit comprises one output terminal optical fiber positioned at a predetermined distance from the focusing lens.

13. The system of claim 12, wherein the at least one second mounting groove has a predetermined length and forms an inverse triangular groove in the substrate so as to receive the output terminal optical fiber therein.

14. The system of claim 12, wherein each of the plurality of disk-type lenses includes a substantially planar face portion oriented in a beam-proceeding direction and a substantially semicircular face portion oriented opposite the planar face portion.

15. The system of claim 1, wherein the first fine lens is positioned proximate the laser beam emitting unit and the plurality of second fine lenses are positioned proximate the beam output unit.

16. The system of claim 4, wherein the first mounting groove extends in a transverse direction across the substrate along a portion of the substrate proximate the laser beam emitting unit.

17. The system of claim 6, wherein the plurality of laser diodes are arranged in a row along a transverse surface of the substrate and substantially parallel to the first fine lens.

18. The system of claim 17, wherein the plurality of laser diodes, the plurality of second fine lenses, and a plurality of output terminal optical fibers of the beam output terminal optical fibers of the beam output unit are all aligned so as to form a corresponding plurality of optical paths.

19. The system of claim 9, wherein the plurality of second mounting grooves each extend in a longitudinal direction of the substrate beginning on a side of the plurality of second fine lenses which is opposite the first fine lens and extending toward the beam output unit.

20. The system of claim 12, wherein a lens curvature of the focusing lens is configured to control an angle of a laser beam output to the output terminal optical fiber.

21. The system of claim 20, wherein the plurality of disk type lenses are arranged in a row in a transverse direction of the substrate with their planar face portions facing the first fine lens and their semicircular face portions facing the focusing lens.

22. The system of claim 21, wherein the focusing lens is positioned in a transverse direction of the substrate along the semicircular face portions of the plurality of disk-type lenses.

23. The system of claim 13, wherein the at least one second mounting groove is formed in a longitudinal direction of the substrate and aligned at a center line of the focusing lens.

* * * * *